United States Patent [19]

Grovenburg

[11] Patent Number: 4,664,508

[45] Date of Patent: May 12, 1987

[54] METHOD AND APPARATUS FOR MAKING A LABEL

[76] Inventor: Dennis E. Grovenburg, 2204 N. 105th St., Apartment 303-F, Seattle, Wash. 98133

[21] Appl. No.: 791,591

[22] Filed: Oct. 25, 1985

[51] Int. Cl.⁴ .................. G03B 27/52; G03B 27/32
[52] U.S. Cl. .................................... 355/40; 355/75; 355/77
[58] Field of Search ................ 355/39, 40, 75, 77

[56] References Cited

U.S. PATENT DOCUMENTS

| | | | |
|---|---|---|---|
| 3,220,301 | 11/1965 | Koonz et al. | 355/40 |
| 3,356,000 | 12/1967 | Marion | 355/40 |
| 3,669,536 | 6/1972 | Scott | 355/40 |

OTHER PUBLICATIONS

Leteron Corp., Torrance, Calif., Visual Information System Advertising Brochure, 1985, U.S.A., pp. 1-5.

Primary Examiner—Richard A. Wintercorn
Attorney, Agent, or Firm—H. Albert Richardson, Jr.

[57] ABSTRACT

A simple and inexpensive method and apparatus for making a label for use on architectural drawings or the like using a number of bars containing standardized or preselected information and a conventional photocopy machine. The apparatus includes one or more bars containing desired information and a base for holding the bars which can be placed on the photocopy machine. Labels are produced by placing the apparatus on the photocopy machine which has been loaded with the desired labeling material and then copying information onto the material. Typically the apparatus and method are used to produce adhesive-backed transparent labels containing drafting symbols or drawing notations.

13 Claims, 7 Drawing Figures

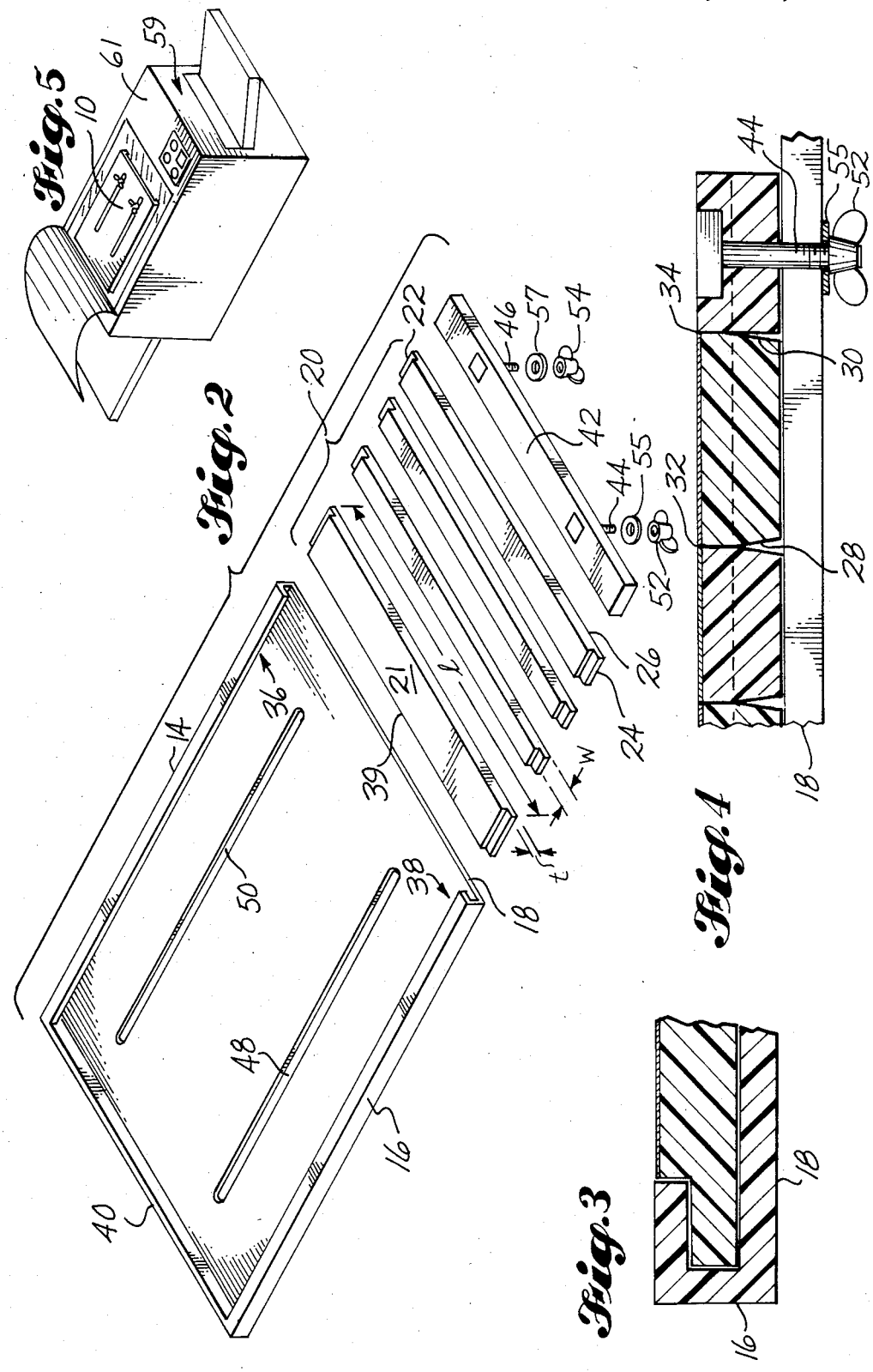

METHOD AND APPARATUS FOR MAKING A LABEL

BACKGROUND OF THE INVENTION

This invention relates generally to a device for use in the drafting and graphical arts and more particularly to an apparatus and process for producing labels and the like containing standardized or preselected information which can be applied, for example, to architectural or engineering drawings.

It is common when preparing mechanical or architectural drawings to use graphical symbols to represent conventional elements or convey information. Such symbols are useful when the details of the represented elements are well known, when the elements appear repeatedly throughout the drawings, or when the information involved could not easily be conveyed by other graphical means. Symbols are frequently used to represent conventional mechanical and electrical circuits, pipe fittings, and valves, to identify material composition, or indicate color. One obvious advantage in the use of symbols is that it results in considerable time savings to the engineer, architect or draftsman preparing the drawings.

In order to promote the increased use and understanding of graphical symbols various professional and trade organizations have throughout the years approved certain standardized symbols for use in their particular industries or trades. Even with the standardization of symbols it has been the normal practice of the person preparing a drawing to include on a drawing a legend or list of each symbol used and a brief statement of its meaning for the convenience of the reader and to reduce the possibility of a misunderstanding. If the drawings are complex or contain many pages the mere preparation of a legend may be quite time consuming.

In addition to these legends, architectural and mechanical drawings often contain lists of notations which may relate to the machining processes to be used on certain parts, heat treatment requirements, standard specification requirements, or other similar items of information. In many large drawing sets the same notation must be repeated many times, and a significant amount of drafting time may be consumed in applying these notations.

One technique which has been used to reduce the amount of time required to apply drawing legends has been to prepare a hand-lettered copy of the legend required, photograph it with a conventional camera, and then process the negative in a machine which will reproduce the information on transparent or opaque adhesive-backed material. After the required number of copies has been made, each copy is trimmed to size, the backing is peeled away and the copy is applied to each drawing. This technique results in a considerable saving of time as compared to what would be required if the legend had been hand-lettered on each drawing, but the equipment required is relatively expensive and therefore not available to most small engineering and architectural firms.

Accordingly, it is an object of this invention to provide an apparatus and method for applying standardized or preselected information to drawings which will result in considerable time savings to the engineer, architect or draftsman.

It is a further object of this invention to provide for a simple and inexpensive apparatus and method for producing multiple copies of a label containing standardized information such as legends or drawing notations which will not require the use of highly specialized and expensive equipment.

SUMMARY OF THE INVENTION

This invention can be broadly summarized as providing for an apparatus for displaying information to be reproduced including a base which can be placed on the document window of a photocopy machine, one or more information bars removeably attached to the base and containing certain preselected information, and means for securing the bar in position on the base.

This invention can also be summarized as providing for a process for making a label for use on architectural drawings or the like using one or more information bars, each having preselected information imprinted thereon, and a conventional photocopy machine loaded with labeling material. The process includes the steps of selecting one or more information bars containing the desired information, securing the bar on a base and then photocopying the assembly so that the information on the bar is reproduced on the material.

BRIEF DESCRIPTION OF THE DRAWINGS

FIG. 2 is an exploded perspective view of the same apparatus.

FIG. 3 is a partial sectional view taken at 3—3 in FIG. 1.

FIG. 4 is a partial sectional view taken at 4—4 in FIG. 1.

FIG. 5 is an end view of the second embodiment of the disclosed apparatus.

DESCRIPTION OF THE PREFERRED EMBODIMENTS

Figure 1:
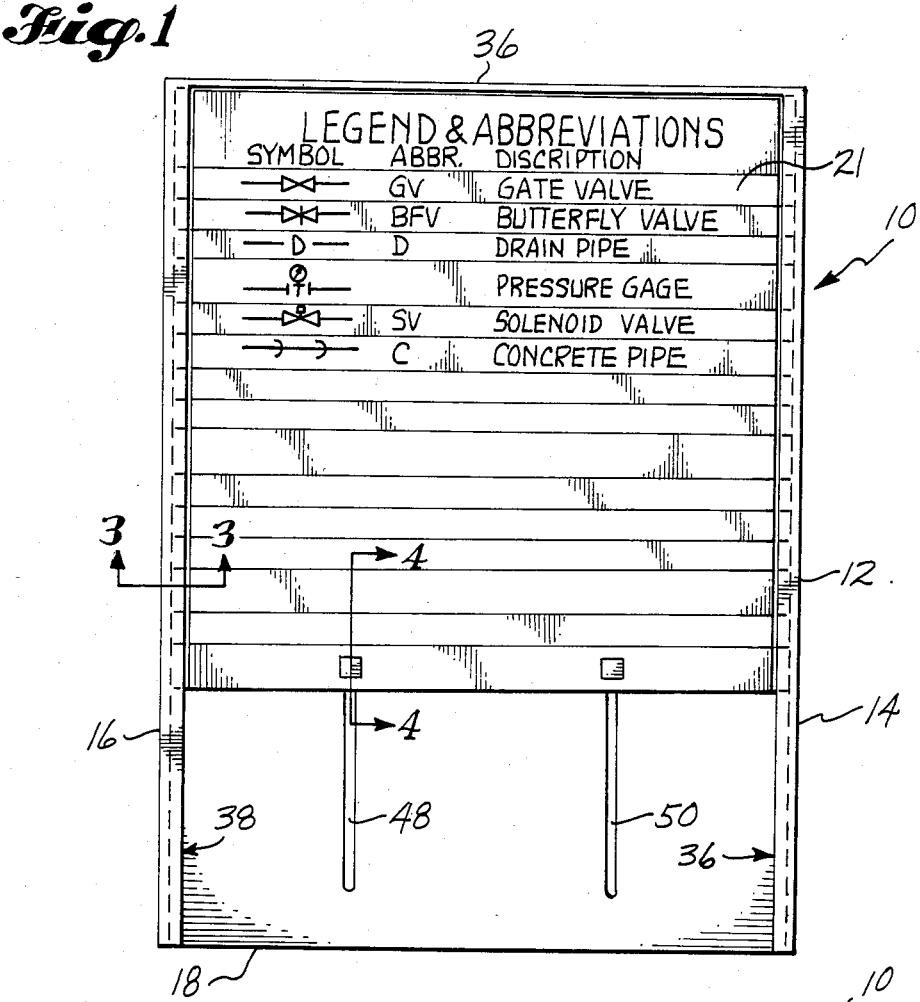
FIG. 1 is a front view of the disclosed apparatus.

The novel features believed characteristic of this invention are set forth in the appended claims. The invention itself may be best understood and its various objects and advantages best appreciated however by reference to the detailed description below in connection with the accompanying drawings.

In FIGS. 1 through 4 of those drawings a holder assembly in accordance with the teachings of the present invention is illustrated and generally designated by the number 10. It includes base 12 which is preferably rectangular and made of a durable plastic. Parallel channel shaped guides 14 and 16 are located on opposing sides of the base and extend the entire length of it as shown in the section of FIG. 3.

Also shown in FIGS. 1 through 4 are a group 20 of information bars which contain various types of standardized written information such as the graphical symbols and corresponding definitions. Each bar has a rectangular front face 21 and the bars all have the same length 1 and thickness t. The width w of the bars may be varied as desired to accommodate various amounts of information. Opposing ends of each bar, for example ends 22 and 24, are adapted to be slideably inserted into channels 14 and 16, respectively. The opposing long sides of each bar, such as sides 28 and 30, are tapered as shown in FIG. 4 so that when the bars are assembled in the base the lines of contact between abutting bars, such as located at points 32 and 34 in FIG. 4, will not be visible on the label.

Written or printed information can be placed on a bar in a variety of ways but one of the simplest is to print the information on a piece of transparent, adhesive-backed plastic material and then place it on the upper surface of the bar. In this manner information on any particular bar can easily be changed from time to time as necessary. Ordinarily, a set of a few dozen bars will be sufficient to contain all the standardized information used on a particular project.

In order to produce a label for use on a particular set of drawings the draftsman must first identify each symbol to be used on the drawing and select information bars which illustrate and define each symbol. Next the information bars should be placed on the base by inserting them into the lower ends 36 and 38 of guides 14 and 16, respectively, in the desired order. The uppermost bar should be moved to the top of the base so that its upper edge 39 abuts stop 40 located at the top of the base. After all of the information bars have been inserted in the base and moved into abutting contact with adjacent bars, bar stop 42 is placed on the base to secure them in position. The stop is preferably a rectangular piece of plastic in which two screws or studs 44 and 46 have been mounted. The studs are spaced apart so that when the stop is placed on the base they pass through slots 48 and 50 in the base. It is secured into position on the base by wing nuts 52 and 54 and washers 55 and 57. Screws 44 and 46 are recessed in the surface of the lock as shown in FIG. 4 and have heads which have been squared to prevent their turning as the wing nuts are tightened.

In order that the adjoining upper edges of the information bars will not produce lines on the label copies, the bars should be pressed together and forced tightly against stop 40 by pressing upward on the bar lock as the wing nuts are tightened.

The next step in producing the labels is to load a conventional photocopy machine with the desired labeling material. Although the labels can be reproduced on any material which a particular machine is capable of handling they will typically be reproduced on adhesive-backed transparent or opaque material. The material must be available in a form which the machine can use, which is normally either roll or sheet form. Referring to FIG. 5, after copier 59 is loaded, the holder assembly is placed on the document window 61 of the copier with the faces of the information bars oriented downward. Finally, the required number of copies is made and each label is trimmed as appropriate.

Figure 6:
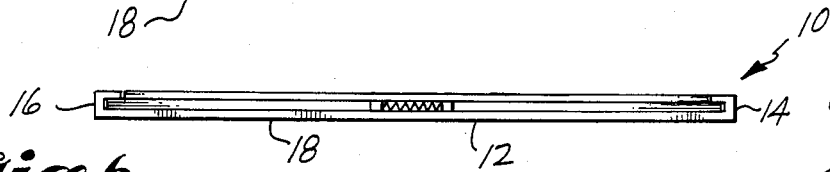
FIG. 6 is an exploded perspective view of the bar lock used in the second embodiment.
Figure 7:
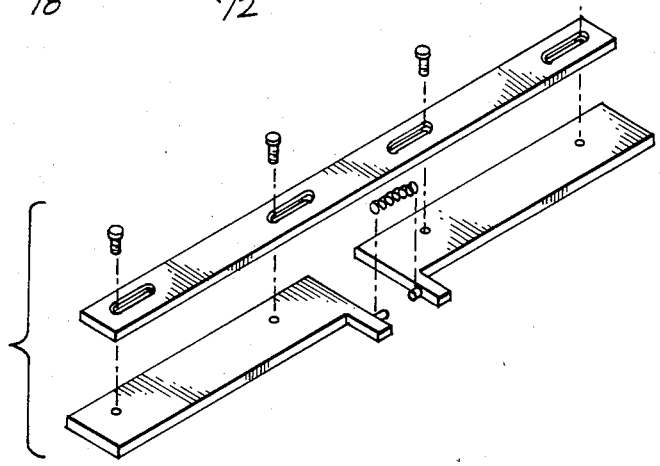
FIG. 7 is a perspective view of a conventional photocopy machine with the apparatus positioned on the document window.

FIGS. 6 and 7 illustrate a second embodiment of this invention including another bar lock generally referred to by the number 60. It includes an upper bar 62, and lower members 64 and 66 which are slideably attached to the upper bar. Preferably the upper bar and the lower members are joined by fasteners 68, 70, 72, and 74, which pass through slots 76, 78, 80 and 82 in the upper bar, respectively, as shown in FIG. 6. Ends 84 and 86 of the lower members are adapted to engage inner walls 88 and 90, respectively, of channels 14 and 16 so as to resist sliding motion of the bar lock within the channels. Opposing levers 92 and 94 which project downward from the lower members provide a means for grasping the bar lock. Spring 96, which is secured in position in between the lower members by pins 98 and 100, tends to force the lower members apart and into locking engagement with the channels. It may be desirable to increase the friction between ends 84 and 86 of the lower members and the walls of the channels by lining the surfaces with rubber or another suitable material.

The bar lock can be operated by grasping levers 92 and 94 between the thumb and forefinger and squeezing them together so as to compress spring 96 and slide members 84 and 86 toward each other. The advantage to this bar lock is that it can be used to press the information bars together and secure them in position with one hand.

Accordingly, it can be seen that the present invention provides a simple and inexpensive method and apparatus for making a label which incorporates many novel features and offers significant advantages over the prior art. Although only two specific embodiments of this invention have been illustrated and described, it is to be understood that obvious modifications and changes can be made in it without departing from the true scope and spirit of the invention.

I claim:

1. An apparatus for displaying information to be reproduced comprising;
    a base adapted to be placed on the document window of a photocopy machine, said base having a display surface, opposing sides, upper and lower edges and a stop;
    at least one information bar slideably secured to the base and contaning preselected information; and
    means for securing the bar in a preselected position on the base and for biasing the bar in the direction of the stop, said means permitting adjustment of the bar in a direction normal to its length.

2. The apparatus of claim 1 wherein the display surface is substantially planar.

3. The apparatus of claim 1 wherein said information bar is substantially rectangular and includes a beveled mating surface.

4. The apparatus of claim 1 wherein said means for securing includes a guide attached to the base and adapted to engage the information bar.

5. The apparatus of claim 4 wherein said information bar has an end adapted to slideably engage the guide.

6. The apparatus of claim 1 wherein the means for securing includes a bar lock slideably attached to the base and adapted to engage a surface of the information bar.

7. The apparatus of claim 6 wherein the base has a slot extending through the display surface and the locking bar is slideably attached to the base by a fastener passing through the slot.

8. The apparatus of claim 1 wherein said means for securing includes a guide attached to the base and a bar lock including a slide and means for biasing the slide into engagement with the guide.

9. An apparatus for displaying information to be reproduced comprising:
    a base adapted to be placed on the document window of a photocopy machine, said base having a display surface, opposing sides, upper and lower edges and a stop;
    at least one information bar slideably attached to the base, having a beveled mating surface and containing preselected written information; and,
    means for securing the bar in a preselected position on the base including a pair of opposing guides attached to the base and for biasing the bar in the direction of the stop, said means permitting adjustment of the bar in a direction normal to its length and adapted to engage opposing ends of the information bar, and a bar lock slideably engaging the channels.

10. A process for making a label for use on architectural drawings of the like utilizing one or more information bars each having preselected information imprinted thereon and a conventional photocopy machine comprising the steps of:

selecting at least one information bar containing desired information;

securing the bar in a holder; said holder including a stop and means for securing the bar in a preselected position in the holder and for biasing the bar in the direction of the stop, said means permitting adjustment of the bar in a direction normal to its length; and, photocopying the holder on the photocopy machine so that the information on the bar is reproduced on the labeling material.

11. The process of claim 10 further including the step of loading the photocopy machine with the desired labeling material.

12. The process of claim 10 further including the step of trimming the material to obtain a label of a desired shape.

13. The process of claim 10 wherein the label is an adhesive-backed transparency.

* * * * *